March 5, 1968     E. C. VANDENBURGH III     3,371,591
COFFEEMAKER
Filed Oct. 20, 1966
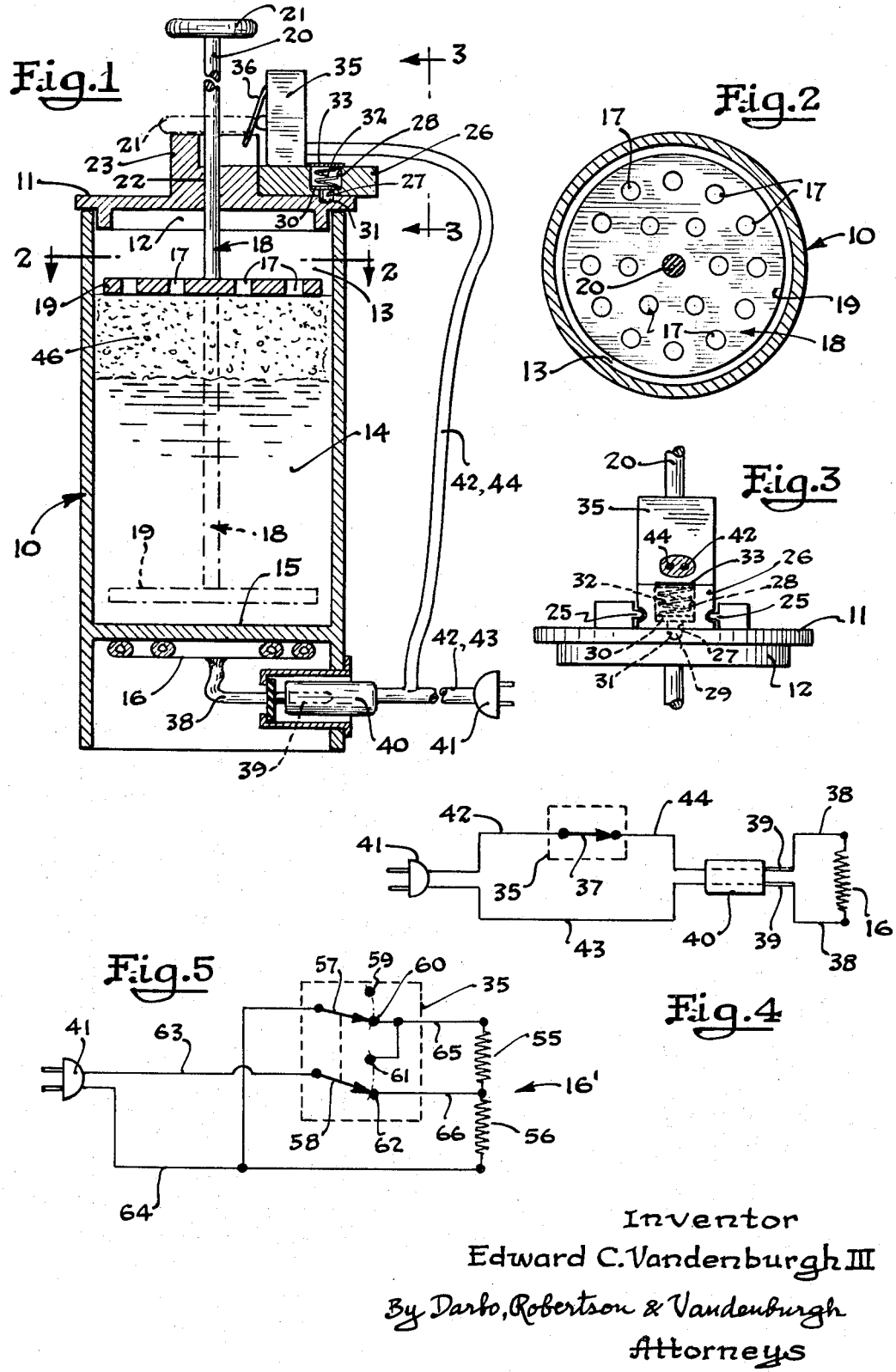
Inventor
Edward C. Vandenburgh III
By Darbo, Robertson & Vandenburgh
Attorneys

United States Patent Office 3,371,591
Patented Mar. 5, 1968

3,371,591
COFFEEMAKER
Edward C. Vandenburgh III, 31 Elizabeth Lane,
Barrington, Ill. 60010
Filed Oct. 20, 1966, Ser. No. 588,056
6 Claims. (Cl. 99—281)

The present invention relates to an apparatus for brewing coffee extract, and the following disclosure is offered for public dissemination upon the grant of a patent therefor.

The coffeemaker of the present invention is for the purpose of preparing "boiled" coffee. It incorporates features for turning off the heat when the coffee comes to a boil. Alternatively, the temperature is lowered at the time that the water comes to a boil, the lowering being to an extent such that the boiling of the water is discontinued. These features, of course, operate automatically. By discontinuing the boiling of the water upon the water coming to a full boil it is not necessary to filter, strain or otherwise mechanically seperate the ground coffee beans from the water. By the action of gravity the ground beans then will settle to the bottom of the pot. The clarified coffee remains on top and may be poured from the pot as a clear coffee extract.

An excellent coffee extract is produced in this manner. It has a very fine flavor and is full bodied without being bitter. The bitter flavor that often results from the boiling of a coffee extract is not present.

Further objects and advantages will become apparent from the following description taken in conjunction with the drawings in which:

FIGURE 1 is a section taken vertically through an embodiment of the present invention.

FIGURE 2 is a horizontal section as seen at line 2—2 of FIGURE 1.

FIGURE 3 is an elevational view of the cap structure as seen at line 3—3 of FIGURE 1.

FIGURE 4 is a schematic wiring diagram, and

FIGURE 5 is a schematic wiring diagram of an alternate embodiment.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The illustrated embodiment comprises a pot, generally 10, in which the coffee extract is brewed. It has an open top on which is received a lid 11. Lid 11 removably rests on the pot 10 and has a depending flange 12 to center it on the pot. The pot has an open interior 13 in which water 14 for brewing the coffee extract is received. In contact with the base 15 of the pot is a resistance heating element 16.

A support, generally 18, comprises a horizontal plate or disc 19 attached to a vertical rod 20. Plate 19 has a plurality of vertical openings 17 therethrough. At the top of rod 20 is a knob 21 which serves as a cam. Rod 20 is guided for vertical movement by passing through a hole 22 in boss 23 of cap 11. The parts are proportioned so that when the support 18 is in the lowered position knob 21 rests on the top of boss 23 of cap 11, with plate 19 being a short distance above the bottom 15 of the pot. The exact extent of this distance will depend upon the pot capacity, and from the following description it will be apparent approximately what should be the extent of this distance for a particular pot.

As best seen in FIGURE 3, the top of pot 11 forms a pair of ways 25 to slidably receive a switch mounting block 26. Mounting block 26 has a small opening 27 on the underside thereof which is coaxial with a large opening 28 extending through the top of the block. A detent 29 is received in small opening 27 and has a flange 30 seated in the bottom of the large opening 28. Detent 29 extends into a cavity 31 in the top of cap 11. The spring 32 is in compression between flange 30 and cover 33 (fastened in block 26) to resiliently urge detent 29 into cavity 31.

The arrangement is such that the detent 29 normally holds mounting block 26 in the position illustrated in FIGURES 1 and 3. However, by exerting a pull on block 26 longitudinally of ways 25, the detent is cammed upwardly against the resistance of spring 32 and the block will slide out of ways 25 for removal.

A switch 35 having an actuator 36 is secured to mounting block 26. The positioning is such that when the mounting block is held in place by the detent the actuator will be contacted by knob 21 when the knob is in the bottom position, so as to change the position of the switch. Referring particularly to FIGURE 4, switch 35 comprises (in the primary embodiment) a normally closed electrical switch 37. When actuator 36 is operated by knob 21 electrical switch 37 opens.

Heating element 16 is connected by wires 38 to prongs 39 received in a disconnect plug 40 (39 and 40 forming a socket and plug). A line plug 41 is connected by wires 42 and 43 to switch 37 and to disconnect plug 40 respectively. A wire 44 connects switch 37 with disconnect plug 40.

When it is desired to brew coffee the cap 11 is removed. The desired amount of water 14 is poured into pot 10. Preferably the water is cold, as it comes from the cold water tap. The desired amount of ground coffee beans 46 is deposited on top of the water. These beans will float on the water. Preferably they are a fairly coarse grind. No effort is made to stir or otherwise wet the beans. Switch 35 is put in place on cap 11 and disconnect plug 40 is engaged with prongs 39. Cap 11 is then placed on pot 10. In doing so, support 18 should be in the raised position. At the time that the cap is in place support 18 is permitted to descend until it rests upon the ground beans 46. The weight of support 18 is such that while it would normally sink in water, it is supported by the ground beans 46 floating on the water.

Plug 41 is inserted in a wall socket to supply electricity to heating element 16. In due course the heating element raises the temperature of water 14 to a point at which it commences to boil. Initially the boiling is confined to the bottom of pot 10 since the upper layers of water have not been fully heated to the boiling point. However, as the water as a whole comes up to about the boiling point, the steam bubbles from the bottom of the pot rise to the surface of the water and commence breaking up the cake that has been formed by the ground coffee 46.

After coming to a full boil it is only a short interval before the cake of ground coffee is broken substantially all the way through by the boiling action. As the coffee bean particles are broken away from the cake they become heavier than water and descend fully into the water. With the cake approximately fully broken there is no longer adequate buoyancy to carry support 18 and it descends of its own weight to the bottom of the pot. This takes place quite rapidly once it commences. Thereupon knob 21 serves as a cam moving actuator 36 of switch 35 to open the electrical switch 37. This cuts off the source of electricity to heater 16. The boiling in pot 10 ends rapidly. As the boiling ceases the ground coffee settles onto the bottom 15 of the pot. Within a few minutes the coffee extract above the ground coffee is clear. It is then ready to be poured from the pot for consumption.

The important feature of this invention is to shut off the source of heat shortly after the water has come to a full boil. The full boil will rapidly break up the cake of ground coffee beans 46 floating on top of the water. Immediately prior to the cake being completely dissipated, the weight of support 18 forces it downwardly so as to open switch 37 and shut off the source of electricity producing heat.

By removing disconnect plug 40 from prongs 39 and switch support block 26 from lid 11, the remainder of the components may be easily washed. To this end heater 16 is waterproof up to prongs 39 which permits pot 10 to be emersed in wash water without harm. Cap 11 with support 18 likewise may be emersed during washing once the switch 35 has been removed by the extraction of support block 26.

FIGURE 5 illustrates an alternative embodiment designed to turn the heat down below the boiling point, while still maintaining some heat for the coffee after the actuation of switch 35 by the descent of support 18. Here the heater 16' comprises two heating elements 55 and 56. Switch 35 comprises double-pole double-throw switches 57 and 58. Switch 57 has two contacts 59 and 60. Switch 58 has two contacts 61 and 62. Wire 63 connects to the source of power and to switch blade 58. Wire 64 connects to the source of power, to switch blade 57 and to one end of resistance element 56. Wire 65 connects contacts 60 and 61 and one end of resistance element 55. Wire 66 connects contact 62 and the two adjacent ends of resistance elements 55 and 56.

FIGURE 5 illustrates the position of switch blades 57 and 58 when the switch 35 is not actuated (in the normal position). In this position the full voltage from the source of electricity is connected across heating elements 55 and 56 in parallel. This will provide a large amount of heat and bring the water to a boil as rapidly as possible. When actuator 36 is operated switch blades 57 and 58 move to contacts 59 and 61 respectively. In this position the full voltage from the source of electricity is connected across the two resistance elements 55 and 56 in series. The two in series increase the resistance and lower the current flow therethrough. This will produce substantially less heat so that the boiling of the coffee is discontinued. At the same time sufficient heat will be supplied so as to keep the coffee warm. It is to be understood, however, that the use of a heating element which is completely turned off when the water comes to a boil, as in FIGURE 4, is preferred to the dual heating procedure of FIGURE 5.

The proportions of water and ground coffee will vary to suit the individual's taste. In general it will be approximately the same proportions as employed in other procedures for brewing coffee. This will provide adequate buoyancy for a support so long as the height of the water in the pot is significantly greater than its diameter.

It is believed to be obvious from the foregoing description that plate 19 performs no filtering action. The holes 17 therein are merely for the purpose of permitting the escape of any steam vapors.

I claim:

1. A coffeemaker for use in brewing coffee from ground coffee beans and adapted to be connected to a source of electricity, said coffeemaker comprising: pot means; a support movable vertically in said pot; an electrical heater for said pot for boiling the water in the pot; circuit means including a switch, said circuit means being connected to said heater and adapted to connect the heater to said source of electricity; and operating means operatively connecting said support and the switch for the switch to have one setting at an elevated position of the support and the switch to have a second setting at a lowered position of the support; said switch being connected to the heater so that the heat supplied to the pot at said one setting is sufficient to boil water therein while the heat supplied at the second setting is not sufficient to boil water therein; whereby said pot may be filled with water and said ground beans floated thereon with the floating beans carrying said support with said switch being at said first setting, said support having sufficient weight that when said beans fail to carry said support as a result of said boiling, said support will sink and change said switch to said second setting.

2. A coffeemaker as set forth in claim 1, wherein said support includes a horizontal disc and a vertical member affixed to the disc and extending upwardly therefrom, said vertical member having a switch operating cam thereon.

3. A coffeemaker as set forth in claim 2, wherein said switch is removably mounted on said pot means in a position to be actuated by said cam.

4. A coffeemaker as set forth in claim 3, wherein said heater is affixed to said pot and is waterproof, said operating means includes wiring and an electrical plug and socket removably connecting the wiring and the switch to said heater.

5. An apparatus as set forth in claim 4, wherein said switch is a double-throw switch and is connected to the heater to increase the amount of resistance connected to said source when said switch is in the second setting.

6. An apparatus as set forth in claim 2, wherein said pot means has an open top with a lid thereover, said member extending through said lid and vertically movable therein, said switch being mounted on and above said lid.

References Cited

UNITED STATES PATENTS

| | | | |
|---|---|---|---|
| 2,158,133 | 5/1939 | Lemp | 99—281 |
| 2,234,741 | 3/1941 | Schurig | 99—320 X |
| 2,560,214 | 7/1951 | Cameron | 99—319 |

WILLIAM I. PRICE, *Primary Examiner.*